United States Patent
Sarcar et al.

(10) Patent No.: US 8,315,268 B1
(45) Date of Patent: Nov. 20, 2012

(54) METHOD AND SYSTEM FOR COMMUNICATION WITH AN ADAPTER

(75) Inventors: Kanoj Sarcar, Fremont, CA (US); Sanjeev Jorapur, San Jose, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 429 days.

(21) Appl. No.: 12/795,563

(22) Filed: Jun. 7, 2010

(51) Int. Cl.
*H04L 12/56* (2006.01)
*G06F 13/14* (2006.01)

(52) U.S. Cl. .......... 370/415; 370/429; 710/39; 711/147; 709/250

(58) Field of Classification Search .................. 370/359, 370/412, 415, 419, 428, 429; 709/228, 250, 709/212; 710/39, 56, 57; 711/147, 154, 711/156
See application file for complete search history.

(56) References Cited

U.S. PATENT DOCUMENTS

| | | | |
|---|---|---|---|
| 6,408,341 B1 * | 6/2002 | Feeney et al. ................. | 709/250 |
| 7,337,240 B2 * | 2/2008 | Bayer et al. ................... | 709/250 |
| 7,363,389 B2 * | 4/2008 | Collins et al. ................. | 709/250 |
| 7,676,597 B2 * | 3/2010 | Kagan et al. ................... | 709/240 |
| 7,685,335 B2 * | 3/2010 | Arndt et al. ..................... | 710/56 |
| 7,735,099 B1 * | 6/2010 | Micalizzi, Jr. ................ | 719/328 |
| 7,908,404 B1 * | 3/2011 | Lok et al. .......................... | 710/5 |
| 8,054,848 B2 * | 11/2011 | Cardona et al. ............... | 370/412 |
| 2002/0144001 A1 * | 10/2002 | Collins et al. ................. | 709/250 |

* cited by examiner

*Primary Examiner* — Chi Pham
*Assistant Examiner* — Ahmed Elallam
(74) *Attorney, Agent, or Firm* — Klein, O'Neill & Singh, LLP

(57) ABSTRACT

A machine implemented method and system for communication between a computing system and an adapter is provided. An application from among a plurality of applications sends a message to the adapter with a value V. The adapter queues the message at the first storage location and writes the value V at a second storage location after the message is successfully queued at the first storage location. To determine if the message was successfully queued, the computing system reads the written value at the second storage location and compares it to the value V that was sent with the message.

15 Claims, 4 Drawing Sheets

METHOD AND SYSTEM FOR COMMUNICATION WITH AN ADAPTER

BACKGROUND

1. Technical Field

This disclosure relates to computing systems.

2. Related Art

Computing systems are commonly interfacing with other devices, for example, adapters. The adapters are designed and built to perform certain functionality. For example, an adapter can be a specialized interface card that provides access to a network (including storage area networks).

A computing system executes a plurality of applications. These applications may communicate with an adapter to perform a function. The applications may send messages to the adapter that are queued and then processed. As number of functions and applications increase, it is desirable to have an efficient communication mechanism for communication between the applications and the adapter.

SUMMARY

In one embodiment, a system is provided. The system includes a computing system executing a plurality of applications; and an adapter interfacing with the computing systems and configured to receive messages sent by the plurality of applications for performing one or more operations. The adapter is configured to have a plurality of message storage locations for queuing the messages sent by the applications.

An application from among the plurality of applications sends a message with a value V to the adapter that is configured to queue the message at a first message storage location from among the plurality of message storage locations and write the value V at a second storage location assigned to the application, after the message is placed at the first message storage location. The application reads the written value at the second storage location and compares it to the value that was sent with the message to determine if the message was successfully queued for processing.

In another embodiment, an adapter is provided. The adapter includes a plurality of message storage locations configured for queuing messages sent by a plurality of applications for performing one or more operations. An application from among the plurality of applications sends a message with a value V to the adapter that is configured to queue the message at a first message storage location from among the plurality of message storage locations and write the value V at a second storage location assigned to the application, after the message is queued at the first message storage location. The application reads the written value at the second storage location and compares it to the value that was sent with the message to determine if the message was successfully queued for processing.

In yet another embodiment, a machine implemented method is provided. The method includes sending a message to an adapter interfacing with a computing system with a value V. An application from among a plurality of applications sends the message to the adapter. The method also includes queuing the message at a first storage location from among a plurality of message storage locations; where the adapter queues the message at the first storage location.

The method further includes writing the value V at a second storage location that is assigned to the application that sent the message, where the adapter writes the value V at the second storage location after the message is successfully queued at the first storage location. The method also includes reading the written value V at the second storage location to ascertain if the message was successfully queued at the first storage location; where the computing system reads the written value at the second storage location and compares it to the value V that was sent with the message, to determine if the message was successfully queued.

This brief summary has been provided so that the nature of the disclosure may be understood quickly. A more complete understanding of the disclosure can be obtained by reference to the following detailed description of the various embodiments thereof concerning the attached drawings.

BRIEF DESCRIPTION OF THE DRAWINGS

The foregoing features and other features of the disclosure will now be described with reference to the drawings of the various embodiments. In the drawings, the same components have the same reference numerals. The illustrated embodiments are intended to illustrate, but not to limit the disclosure. The drawings include the following figures.

DETAILED DESCRIPTION

Figure 1A:
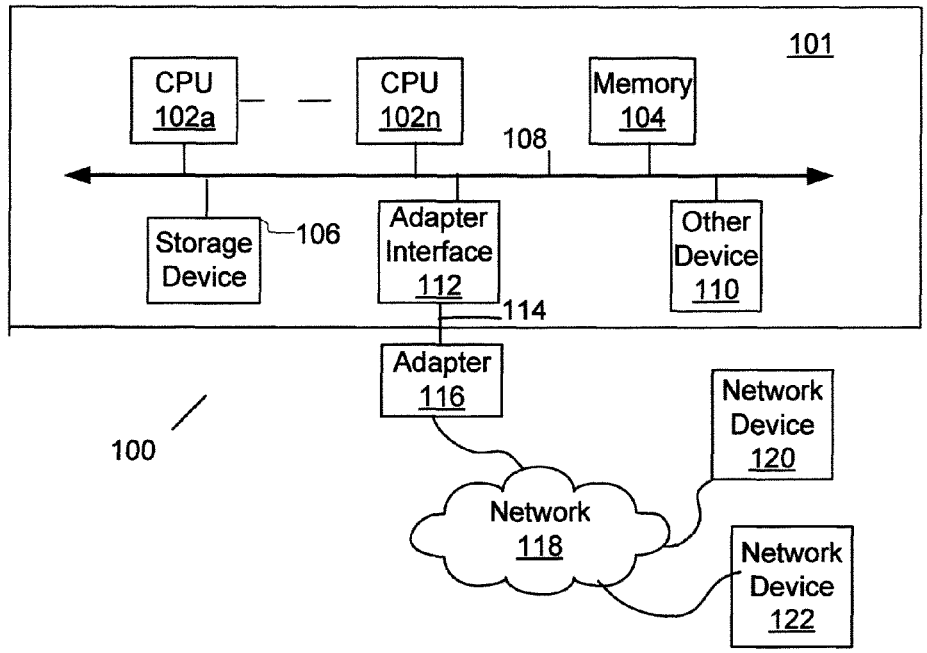
FIG. 1A shows a block diagram of the internal functional architecture of a computing system for use with an embodiment of the current disclosure.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

To facilitate an understanding of the various embodiments, the general architecture and operation of a computing system in a network will be described. The specific architecture and operation of the various embodiments will then be described with reference to the general architecture.

FIG. 1A shows a block diagram of the internal functional architecture of a system 100 that is used to implement various aspects of the current disclosure. System 100 includes one or more computing systems 101 that may include one or more central processing units (CPUs) 102a-102n (referred to as CPU 102) for executing program instructions. CPU 102 may be a general-purpose processor or another type of processor. CPU 102 interfaces with a bus 108 and executes program instructions out of a memory 104. Bus 108 is an abstract interconnect system that can include, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other kind of bus.

Computing system 101 also includes or has access to a storage device 106. Storage device 106 may include disks, tapes, drums, integrated circuits, non-volatile memory or the like, operative to hold data by any means, including magnetically, electrically, optically, and the like. In one embodiment, storage device 106 stores operating system program files, application program files, and other files.

CPU 102 interfaces with memory 104 that may include random access main memory (RAM), and/or read only memory (ROM). When executing stored computer-executable process steps from storage 106, CPU 102 may store and execute the process steps out of memory 104. ROM may store invariant instruction sequences, such as start-up instruction sequences or basic input/output operating system (BIOS) sequences for operation of a keyboard (not shown).

The computing system 101 also includes other devices and interface 110. The other devices may include, for example, video graphics and sound generation hardware.

Computing system 101 interfaces with an adapter 116 via an adapter interface 112 and link 114. The structure and logic for adapter interface will depend on the functionality of adapter 116 and the protocols/standards that are used by adapter 116 for communicating with computing system 101 and other devices. As an example, adapter 116 can be a host bus adapter, a host channel adapter, a network adapter or any other type of adapter that performs one or more functions.

Adapter 116 may be connected to other systems, for example, network devices 120-122 through a network 118. Adapter 116 may be adapted to one or more of a wide variety of networks, including local area networks, storage area networks, wide area networks, server networks, the Internet, and the like. Adapter 116 may be configured to handle both network and storage traffic using various network and storage protocols. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The adaptive embodiments disclosed herein are not limited to any particular protocol, as long as the functional goals are met by an existing or new network protocol.

One common storage protocol used to access storage systems is Fibre Channel. Fibre channel is a set of American National Standards Institute (ANSI) standards that provide a serial transmission protocol for storage and network protocols such as HIPPI, SCSI, IP, ATM and others. Fibre channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_Port establishes a connection to a Fabric element (e.g., a switch) having a fabric port or F_port.

A new and upcoming standard, called Fibre Channel over Ethernet (FCoE) has been developed to handle both Ethernet and Fibre Channel traffic in a SAN. This functionality would allow Fibre Channel to leverage 10 Gigabit Ethernet networks while preserving the Fibre Channel protocol. The adapter 116 shown in FIG. 1A may be configured to operate as a FCoE adapter and may be referred to as FCoE adapter 116. QLogic Corporation, the assignee of the present application, provides one such adapter. Those of ordinary skill in the art will appreciate, however, that the present embodiments are not limited to any particular protocol. The illustrated adapter 116 is merely one example of a converged network adapter that may leverage the advantages of the present embodiments.

Figure 1C:
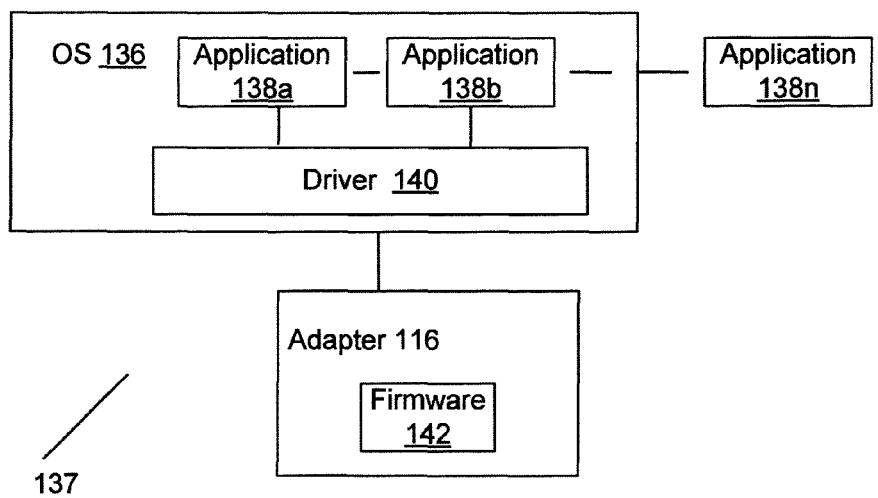
FIG. 1C shows a block diagram of an architecture used by a computing system according to an embodiment of the current disclosure.
Figure 1B:
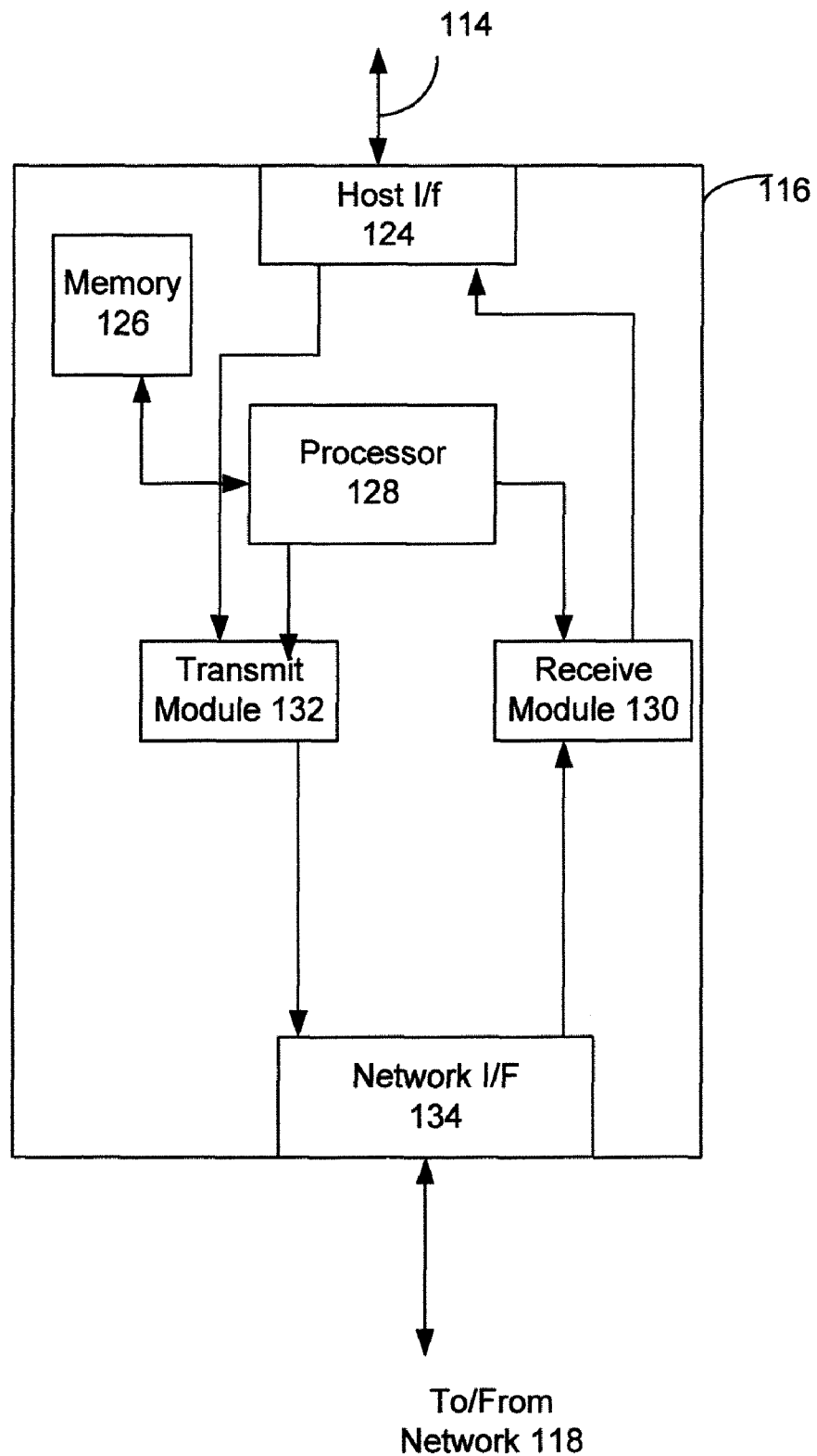
FIG. 1B shows a block diagram of an adapter, used according to one embodiment.

FIG. 1B shows a block diagram of adapter 116, used according to one embodiment. Adapter 116 includes a processor 128 that may execute firmware instructions out of a memory 126 for controlling overall adapter 116 functionality. A host interface 124 interfaces with computing system 101 via interconnect (or link 114). The structure and design of interface 124 depends on the type of interconnect. For example, if interconnect 114 is a PCI-Express link, then host interface 124 includes logic and circuitry to handle PCI-Express based traffic. The embodiments herein are not limited to any particular interconnect type.

Adapter 116 includes a transmit module 132 for handling transmit traffic from adapter 116. The transmit traffic is sent by computing system 101. Transmit module 132 may include memory buffers (not shown) for storing transmit packets.

Adapter 116 also includes a receive module 130 that processes information received from other devices from example, via a network 118. Receive module 130 may also include memory buffers for temporarily storing received information, before the information is sent to computing system 101.

Adapter 116 further includes a network interface 134. The design and structure of interface 134 depends on a protocol and link 118. For example, to handle FCoE traffic, interface 134 will have logic and circuitry to send and receive FCoE packets. Similarly, where adapter 116 is an Ethernet, Fibre Channel or any other type of adapter, then it will have the necessary structure and design to handle the relevant protocol/standard.

FIG. 1C is block diagram of architecture 137 used by computing system 101 for communicating with adapter 116 and other devices. Architecture 137 includes an operating system 136 that is typically executed by CPU 102 of computing system 101. Various applications shown as 138a-138n (may also be referred to as application 138 or applications 138) are executed. Some are executed within the operating system context and they communicate with adapter 116 via a driver 140. Others, for example, 138n may communicate directly with adapter 116.

Driver 140 takes an application request/message and then sends it to adapter 116. Adapter 116 executes firmware instructions 142 out of adapter memory to interface with driver 140. It is noteworthy that although a single driver block 140 is shown, more than one driver instance may be used to communicate with adapter 116. For example, each application may have a dedicated driver or a driver instance for communicating with adapter 116.

Applications 138 typically send a message for adapter 116 to perform a function. For example, application 138 may send a message and data to adapter 116 for transmitting information to a network device.

As the number of applications increase in computing systems, for promptly responding to application messages, adapter 116 may need the ability to queue the messages efficiently and indicate to the computing system that the messages have been queued. The embodiments of the present disclosure provide a process and a mechanism to queue messages efficiently, as described below with respect to FIG. 1D and FIG. 2. Because messages are queued efficiently, they can also be processed and managed efficiently.

Figure 1D:
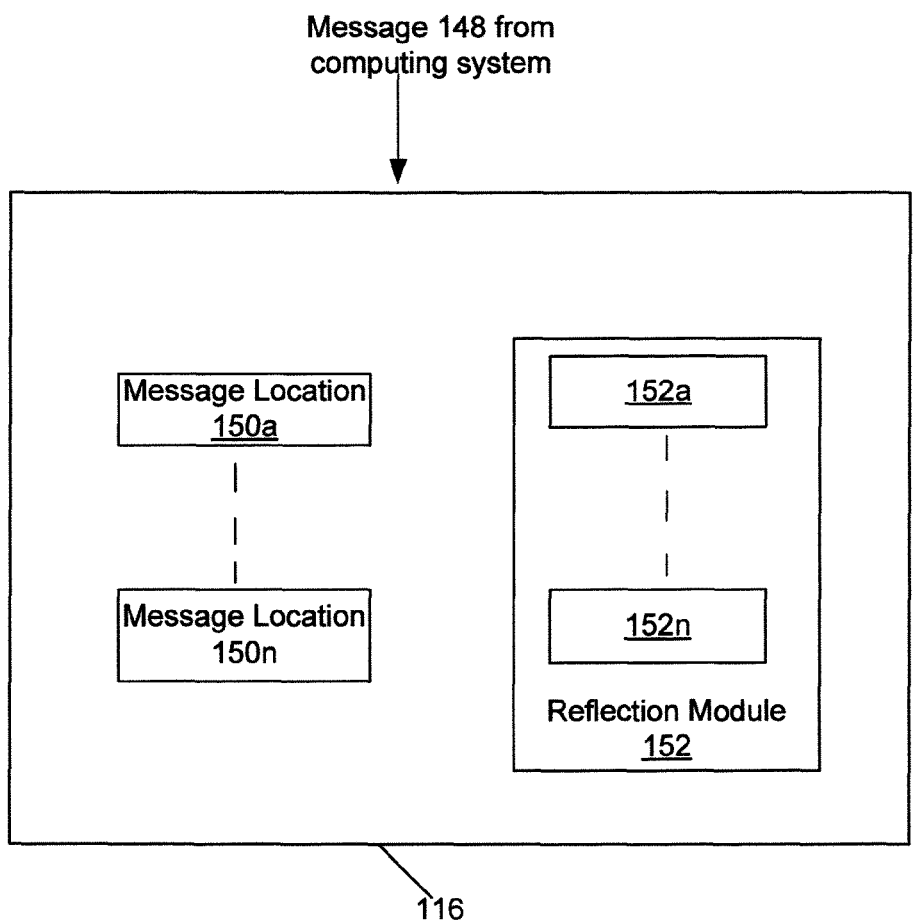
FIG. 1D shows an example of a system used for communication between an adapter and a computing system, according to an embodiment of the current disclosure.

FIG. 1D shows a system used for communication between adapter 116 and computing system 101. The messages are sent by the computing system 101 for performing a function. The messages are queued by adapter 116 and then processed.

Adapter 116 includes a plurality of message locations 150a-150n. A message location, for example, 150a may be referred to as a first storage location. In one embodiment, one message location can only hold only one message. In another embodiment, a message location can hold more than one message. Each message location has a finite amount of storage space for storing a message received from an application. In one embodiment, each application can be assigned a dedicated message location. This means that when an application, for example, 138a sends a message, it is stored at an assigned location, for example, 150a. In another embodiment, message locations 150a-150n are not assigned to any individual application, instead, one message location, for example, 150a can be used to store messages from more than one application.

As applications 138 send messages, they are stored at message locations 150. Processor 128 consumes the messages to perform certain tasks. Message space may become unavailable if the applications 138 operate at a faster rate than processor 128. In one embodiment, as described below in more detail, a reflection module 152 is provided so that applications become aware when space becomes unavailable for storing messages.

The reflection module 152 is accessible to applications 138 and processor 128 of adapter 116. Reflection module 152 can be a set of registers with multiple storage locations (may be referred to as slots) 152a-152n or any other type of storage locations. Each slot of reflection module 152 may be referred to as a second storage location, which is dedicated and assigned to a particular application. For example, slot 152a is assigned for application 138a and slot 152n is assigned for application 138n.

When an application sends a message to adapter 116, the application also provides a value "V". If the message is successfully queued by adapter 116 at a message location, adapter 116 then writes the value V at a reflection module slot (e.g. 152a) assigned to the application. The application (for example, 138a) then reads the value written by adapter 116 and compares it to the value that was provided with the message. If the value is the same, the application concludes that the message was successfully queued by adapter 116 and that the application does not have to resend the message.

To ensure that the same value is not being re-written, the application alters a special bit value in the value V that is provided to adapter 116. The application can toggle the special bit value, for example, between "0" to "1". For example, when a first message is sent by the application, the special bit in V may have a value of 0. When a second message is sent, the same bit may have a value of 1. When adapter 116 writes the value V for the first message and the second message with different special bit values, the application program associated with both messages is able to differentiate between the values V for both the messages.

Figure 2:
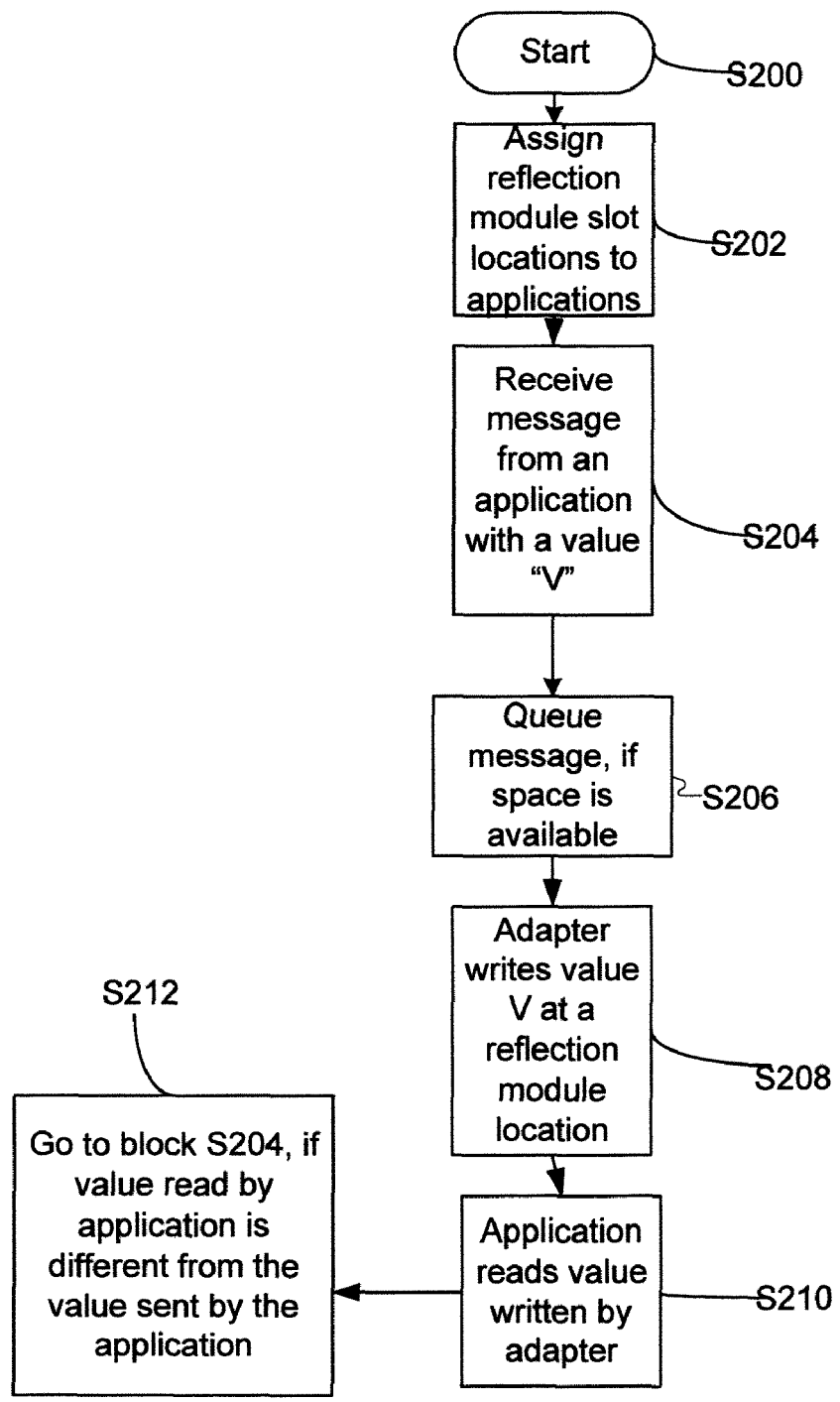
FIG. 2 shows a process flow diagram, according to an embodiment of the current disclosure.

Process Flow Diagram:

FIG. 2 shows a process flow diagram for sending messages to adapter 116, according to one embodiment. The process begins in block S200. In block S202, reflection module 152 locations are assigned to applications 138. Block S202 can be performed when application 138 is initialized and after adapter 116 has been configured. The adapter 116 configuration may be performed by using a management application that is executed by a computing system (for example 101).

In block S204, application 138 initiates sending a message to adapter 116. This can be performed by CPU 102 executing program instructions or via a write operation. The message is then sent to adapter 116 via adapter interface 114.

As described, the message includes a value V with a special bit that can be set to specific value, for example, 0 or 1.

In block S206, adapter 116 determines if space is available to store the message. In one embodiment, Adapter 116 can use any message location (i.e. 150a-150n) to store the message. In another embodiment, if message locations are assigned to specific applications, then adapter 116 simply checks to see if space is available at the assigned message location.

If space is available, then adapter 116 stores the message at the message location and writes the value V at a reflection module slot that is assigned to the application sending the message. The mechanism for correlating application 138a's message to reflection module slot 152a will depend on the type of interconnects between application 138a and adapter 116. For example, if link 114 is a PCI-Express link then the message from application 138a would include a PCI-Express address that can be used to identify application 138a and processor 128 can update slot 152a assigned to application 138a. In another example, the message may include identification information (for example, an identification tag) that identifies application 138a and processor 128 can use the identification information to update slot 152a.

Thereafter, in block S210, application 138a reads the value from reflection module slot (152). If the value read is the same as the value sent by the application in block S204, then the application can conclude that the message was successfully queued. If the value is different, then in block S212, the process moves to block S204, where the application tries again to send a message.

If there is no space available, as determined in block S206, adapter 116 does not perform the operation in block S208, however, application 138 may still performs blocks S210 and 5212.

The embodiments disclosed herein have various advantages. A computing system only has to perform a read operation from the reflection module to ascertain if a message is queued. This does not require complex interrupt or handshake mechanisms that are commonly used between computing system and adapter communication.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A machine implemented method, comprising:
   (a) sending a message to an adapter interfacing with a computing system with a value V; wherein an application from among a plurality of applications sends the message to the adapter;
   (b) queuing the message at a first storage location from among a plurality of message storage locations; wherein the adapter queues the message at the first storage location;
   (c) writing the value V at a second storage location that is assigned to the application that sent the message in step (a); wherein the adapter writes the value V at the second storage location after the message is successfully queued at the first storage location; and
   (d) reading the written value V at the second storage location to ascertain if the message was successfully queued at the first storage location; wherein the computing system reads the written value at the second storage location and compares it to the value V that was sent with the message in step (a), to determine if the message was successfully queued.

2. The method of claim 1, wherein the value V includes a special bit value which is reversed each time the application sends a message.

3. The method of claim 1, wherein the second storage location is a slot from among a plurality of slots of a register, where each slot is assigned to one of the plurality of applications.

4. The method of claim 1, wherein each message storage location is assigned to one of the plurality of applications for storing messages from the assigned application.

5. The method of claim 1, wherein the adapter is a network adapter that provides the computing system access to a network.

6. A system, comprising:
   a computing system executing a plurality of applications; and
   an adapter interfacing with the computing system and configured to receive messages sent by the plurality of applications for performing one or more operations;
   wherein the adapter is configured to have a plurality of message storage locations for queuing the messages sent by the applications;
   wherein an application from among the plurality of applications sends a message with a value V to the adapter that is configured to queue the message at a first message storage location from among the plurality of message storage locations and write the value V at a second storage location assigned to the application, after the message is placed at the first message storage location; and
   wherein the application reads the written value at the second storage location and compares it to the value that was sent with the message to determine if the message was successfully queued for processing.

7. The system of claim 6, wherein the value V includes a special bit value which is reversed each time the application sends a message.

8. The system of claim 6, wherein the second storage location is a slot from among a plurality of slots of a register, where each slot is assigned to one of the plurality of applications.

9. The system of claim 6, wherein each message storage location is assigned to one of the plurality of applications for storing messages from the assigned application.

10. The system of claim 6, wherein the adapter is a network adapter that provides the computing system access to a network.

11. An adapter, comprising:
    a plurality of message storage locations configured for queuing messages sent by a plurality of applications for performing one or more operations;
    wherein an application from among the plurality of applications sends a message with a value V to the adapter that is configured to queue the message at a first message storage location from among the plurality of message storage locations and write the value V at a second storage location assigned to the application, after the message is queued at the first message storage location; and
    wherein the application reads the written value at the second storage location and compares it to the value that was sent with the message to determine if the message was successfully queued for processing.

12. The adapter of claim 11, wherein the value V includes a special bit value which is reversed each time the application sends a message.

13. The adapter of claim 11, wherein the second storage location is a slot from among a plurality of slots of a register, where each slot is assigned to one of the plurality of applications.

14. The adapter of claim 11, wherein each message storage location is assigned to one of the plurality of applications for storing messages from the assigned application.

15. The adapter of claim 11, wherein the adapter is a network adapter that provides a computing system access to a network.

* * * * *

UNITED STATES PATENT AND TRADEMARK OFFICE
CERTIFICATE OF CORRECTION

PATENT NO. : 8,315,268 B1
APPLICATION NO. : 12/795563
DATED : November 20, 2012
INVENTOR(S) : Kanoj Sarcar et al.

It is certified that error appears in the above-identified patent and that said Letters Patent is hereby corrected as shown below:

In the Specifications:

In column 6, lines 39-40, delete "As described, the message includes a value V with a special bit that can be set to specific value, for example, 0 or 1." and insert the same after "114." on column 6, line 38 as a continuation of the same paragraph.

In column 7, line 4, delete "5212." and insert -- S212. --, therefor.

Signed and Sealed this
Fourteenth Day of May, 2013

Teresa Stanek Rea
*Acting Director of the United States Patent and Trademark Office*